United States Patent
Kim et al.

(10) Patent No.: US 11,025,455 B2
(45) Date of Patent: Jun. 1, 2021

(54) METHOD FOR ESTIMATING SELF-INTERFERENCE CHANNEL AND DEVICE FOR SAME

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Sooyong Choi, Seoul (KR); Sangjoon Park, Seoul (KR); Kwangseok Noh, Seoul (KR); Kyungsik Min, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 385 days.

(21) Appl. No.: 16/301,204

(22) PCT Filed: Apr. 26, 2017

(86) PCT No.: PCT/KR2017/004418
§ 371 (c)(1),
(2) Date: Nov. 13, 2018

(87) PCT Pub. No.: WO2017/196008
PCT Pub. Date: Nov. 16, 2017

(65) Prior Publication Data
US 2020/0322186 A1    Oct. 8, 2020

Related U.S. Application Data

(60) Provisional application No. 62/335,697, filed on May 13, 2016.

(51) Int. Cl.
*H04L 25/02* (2006.01)
*H04L 1/08* (2006.01)
(Continued)

(52) U.S. Cl.
CPC ....... *H04L 25/0202* (2013.01); *H04B 7/0413* (2013.01); *H04L 1/08* (2013.01);
(Continued)

(58) Field of Classification Search
CPC ... H04L 25/0202; H04L 25/0224; H04L 1/08; H04L 5/0048; H04L 5/14; H04L 5/1461;
(Continued)

(56) References Cited

U.S. PATENT DOCUMENTS

2012/0201153 A1    8/2012  Bharadia et al.
2013/0286903 A1    10/2013 Khojastepour et al.
(Continued)

FOREIGN PATENT DOCUMENTS

KR    1020100088555    8/2010
KR    1020160019431    2/2016
(Continued)

OTHER PUBLICATIONS

PCT International Application No. PCT/KR2017/004416, Written Opinion of the International Searching Authority dated Aug. 14, 2017, 21 pages.
(Continued)

*Primary Examiner* — Hashim S Bhatti
*Assistant Examiner* — Abdullahi Ahmed
(74) *Attorney, Agent, or Firm* — Lee, Hong, Degerman, Kang & Waimey PC

(57) ABSTRACT

A method for estimating a self-interference channel by a communication device which operates in a full-duplex mode can comprise the steps of: transmitting a reference signal in a first transmission unit by means of resource elements (REs) of which the number is smaller than the number of antennas of a communication device; estimating a self-interference channel by using a first reference signal matrix, which is returned by means of a self-interference channel in
(Continued)

the first transmission unit, and reference signal matrices which are returned by means of a self-interference channel in a predetermined number of transmission units prior to the first transmission unit; and storing information about the estimated self-interference channel.

14 Claims, 11 Drawing Sheets

(51) Int. Cl.
| | | |
|---|---|---|
| *H04L 5/00* | (2006.01) | |
| *H04L 5/14* | (2006.01) | |
| *H04W 24/08* | (2009.01) | |
| *H04W 72/08* | (2009.01) | |
| *H04B 7/0413* | (2017.01) | |

(52) U.S. Cl.
CPC .............. *H04L 5/0048* (2013.01); *H04L 5/14* (2013.01); *H04L 25/0224* (2013.01); *H04W 24/08* (2013.01); *H04W 72/082* (2013.01)

(58) Field of Classification Search
CPC ........... H04L 25/03343; H04L 25/0228; H04L 25/0242; H04B 7/0413; H04W 24/08; H04W 72/082
See application file for complete search history.

(56) References Cited

U.S. PATENT DOCUMENTS

| | | | |
|---|---|---|---|
| 2013/0301487 A1 | 11/2013 | Khandani | |
| 2014/0146765 A1* | 5/2014 | Ji | H04W 72/082 |
| | | | 370/329 |
| 2015/0103802 A1* | 4/2015 | Cheng | H04L 25/0232 |
| | | | 370/330 |
| 2016/0330011 A1* | 11/2016 | Lee | H04L 5/006 |
| 2017/0223688 A1* | 8/2017 | Chen | H04B 7/06 |
| 2017/0331577 A1* | 11/2017 | Parkvall | H04L 5/1469 |

FOREIGN PATENT DOCUMENTS

| | | |
|---|---|---|
| KR | 1020160023666 | 3/2016 |
| WO | 2012063351 | 5/2012 |
| WO | 2015094914 | 6/2015 |
| WO | 2016060466 | 4/2016 |
| WO | 2016064046 | 4/2016 |

OTHER PUBLICATIONS

PCT International Application No. PCT/KR2017/004418, Written Opinion of the International Searching Authority dated Jul. 28, 2017, 16 pages.
United States Patent and Trademark Office U.S. Appl. No. 16/301,383, Office Action dated Feb. 24, 2021, 16 pages.

* cited by examiner

METHOD FOR ESTIMATING SELF-INTERFERENCE CHANNEL AND DEVICE FOR SAME

CROSS-REFERENCE TO RELATED APPLICATIONS

This application is the National Stage filing under 35 U.S.C. 371 of International Application No. PCT/KR2017/004418, filed on Apr. 26, 2017, which claims the benefit of U.S. Provisional Application No. 62/335,697, filed on May 13, 2016, the contents of which are all hereby incorporated by reference herein in their entirety.

TECHNICAL FIELD

The present invention relates to a wireless communication system, and more particularly, to a method of estimating a self-interference channel and an apparatus therefor.

BACKGROUND ART

As a general expression of wireless transmission, in case of performing wireless transmission between a base station and a user equipment (UE), a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD). When a time domain radio resource is divided into a DL time duration resource and a UL time duration resource on the same frequency band and transmission and reception are performed, it is referred to as time division duplex (TDD).

Full-Duplex communication or Full-Duplex Radio (hereinafter, FDR) corresponds to a scheme that a single node performs transmission and reception at the same time in the same time and frequency resources. The FDR is distinguished from legacy half-duplex communication in that the legacy half duplex uses time resources or frequency resources by dividing the resources to make the resources to be orthogonal. Compared to the half-duplex communication scheme, the FDR can theoretically make system capacity to be doubled.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

DISCLOSURE OF THE INVENTION

Technical Tasks

A technical task of the present invention is to provide a method for a communication device operating in a full duplex mode to estimate a self-interference channel.

Another technical task of the present invention is to provide a communication device in a full-duplex mode for estimating a self-interference channel.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for estimating a self-interference channel by a communication device operating in a full duplex mode, includes the steps of transmitting a reference signal in a first transmission unit through resource elements (REs) less than a number of antennas of the communication device, estimating a self-interference channel using a first reception signal matrix fed back via the self-interference channel in the first transmission unit and reception signal matrixes fed back via the self-interference channel in a predetermined number of transmission units prior to the first transmission unit, and storing information on the estimated self-interference channel.

The reference signal of the first transmission unit may be transmitted by applying a partial reference signal sequence matrix corresponding to columns, which are less than the number of antenna of the communication device and selected from a predefined N×K reference sequence matrix, to the reference signal. The method can include the step of transmitting a reference signal in a second transmission unit via REs less than the number of antennas of the communication device. In this case, a reference signal of the second transmission unit can be transmitted by applying a partial reference signal sequence matrix corresponding to columns, which are selected as many as the number from a next column of the selected columns from the predefined N×K reference sequence matrix, to the reference signal. The method can further include the step of transmitting a reference signal in a second transmission unit via REs less than the number of antennas of the communication device. In this case, when the last column applied to the reference signal of the first transmission unit corresponds to the last column in the predefined N×K reference signal sequence matrix, the reference signal of the second transmission unit can be transmitted by applying a partial reference signal sequence matrix corresponding to columns, which are selected as many as the number from the first column of the predefined N×K reference signal sequence matrix based on a cyclic permutation scheme, to the reference signal of the second transmission unit. A specific column of the predefined N×K reference signal sequence matrix may correspond to a reference signal transmitted via the total K number of antennas in a specific RE. A specific row of the predefined N×K reference signal sequence matrix may correspond to a reference signal transmitted via the N number of REs through a specific antenna port. The communication device can include a user equipment or a base station.

To further achieve these and other advantages and in accordance with the purpose of the present invention, according to a different embodiment, a communication device in a full duplex mode for estimating a self-interference channel can include a transmitter configured to transmit a reference signal in a first transmission unit through resource elements (REs) less than a number of antenna of the communication device, a processor configured to estimate a self-interference channel using a first reception signal matrix fed back via the self-interference channel in the first transmission unit and reception signal matrixes fed back via the self-interference channel in a predetermined number of transmission units prior to the first transmission unit, and a memory configured to store information on the estimated self-interference channel.

The processor can be configured to apply a partial reference signal sequence matrix corresponding to columns, which are less than the number of antennas of the communication device and selected from a predefined N×K reference sequence matrix, to the reference signal, to the reference signal of the first transmission unit.

The transmitter is configured to transmit a reference signal in a second transmission unit via REs less than the number of antenna of the communication device and the processor can apply a partial reference signal sequence matrix corresponding to columns, which are selected as many as the number from a next column of the selected columns from the predefined N×K reference sequence matrix, to the reference signal of the second transmission unit.

The transmitter is configured to transmit a reference signal in a second transmission unit via REs less than the number of antenna of the communication device. When the last column applied to the reference signal of the first transmission unit corresponds to the last column in the predefined N×K reference signal sequence matrix, the processor can apply a partial reference signal sequence matrix corresponding to columns, which are selected as many as the number from the first column of the predefined N×K reference signal sequence matrix based on a cyclic permutation scheme, to the reference signal of the second transmission unit.

A specific column of the predefined N×K reference signal sequence matrix may correspond to a reference signal transmitted via the total K number of antennas in a specific RE. A specific row of the predefined N×K reference signal sequence matrix may correspond to a reference signal transmitted via the N number of REs through a specific antenna port.

The communication device can include a user equipment or a base station.

Advantageous Effects

Since DL transmission and UL transmission are simultaneously performed in a data transmission/reception section of a full duplex system, although a base station or a user equipment uses REs less than the number of antennas in transmitting a reference signal, it is able to increase a data transfer rate in DL and UL at the same time.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3$^{rd}$ Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices.

Wherever possible, the same reference numbers will be used throughout the drawings to refer to the same or like parts.

Moreover, in the following description, specific terminologies are provided to help the understanding of the present invention. And, the use of the specific terminology can be modified into another form within the scope of the technical idea of the present invention.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

Figure 1:
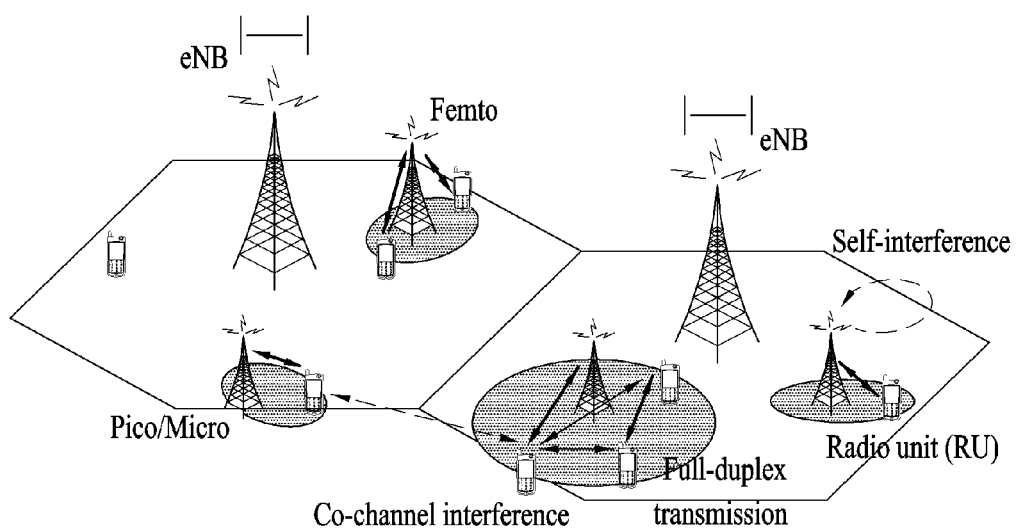
FIG. 1 is a conceptual diagram of a user equipment and a base station supporting FDR.
Figure 2:
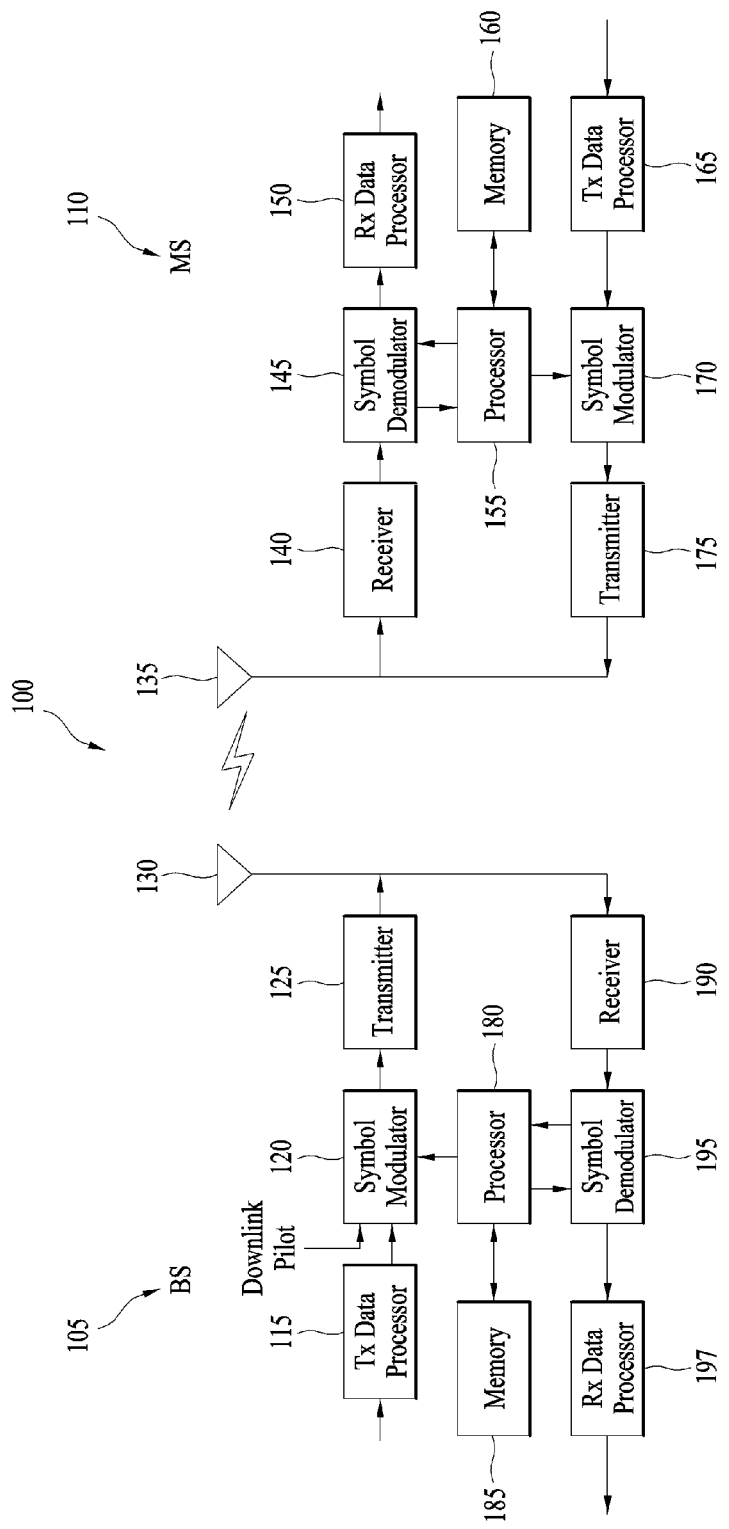
FIG. 2 is a block diagram illustrating configurations of a base station 105 and a user equipment 110 in a wireless communication system 100.

FIG. 2 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 2, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
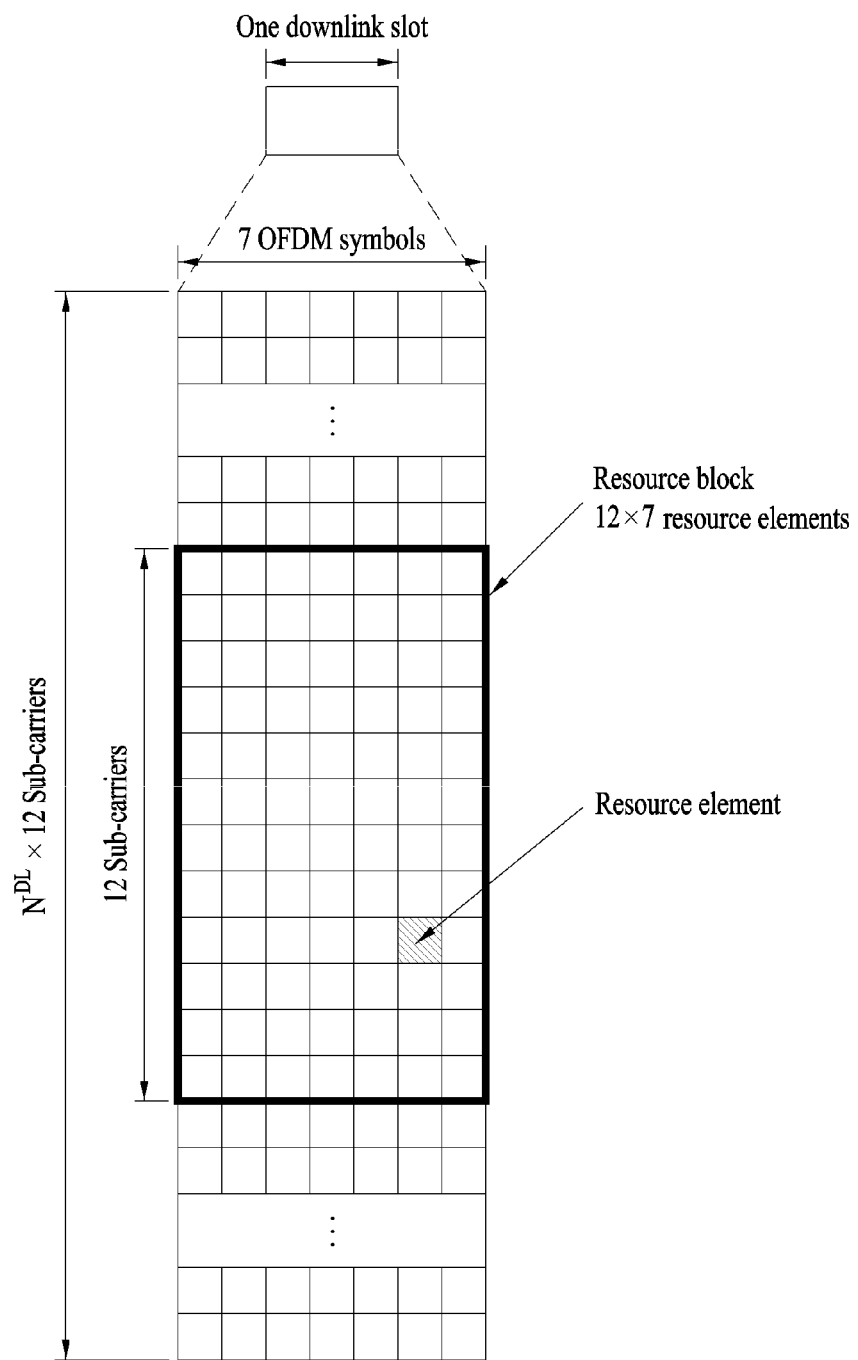
FIG. 3 is a diagram illustrating a resource grid of a downlink slot of 3GPP LTE/LTE-A system corresponding to one example of a wireless communication system.

FIG. 3 illustrates a resource grid for the duration of one DL slot in the 3GPP LTE/LTE-A system as an exemplary wireless communication system.

Referring to FIG. 3, a DL slot includes a plurality of OFDM symbols in the time domain. One DL slot includes 7 (or 6) OFDM symbols in the time domain by a plurality of Resource Blocks (RBs) in the frequency domain. Each RB includes 12 subcarriers. Each element of a resource grid is called a Resource Element (RE). One RB includes 12×7(6) REs. The number of RBs in a DL slot, $N_{RB}$ depends on a DL transmission band. The structure of a UL slot is identical to that of a DL slot, except that OFDM symbols are replaced with SC-FDMA symbols.

Figure 4:
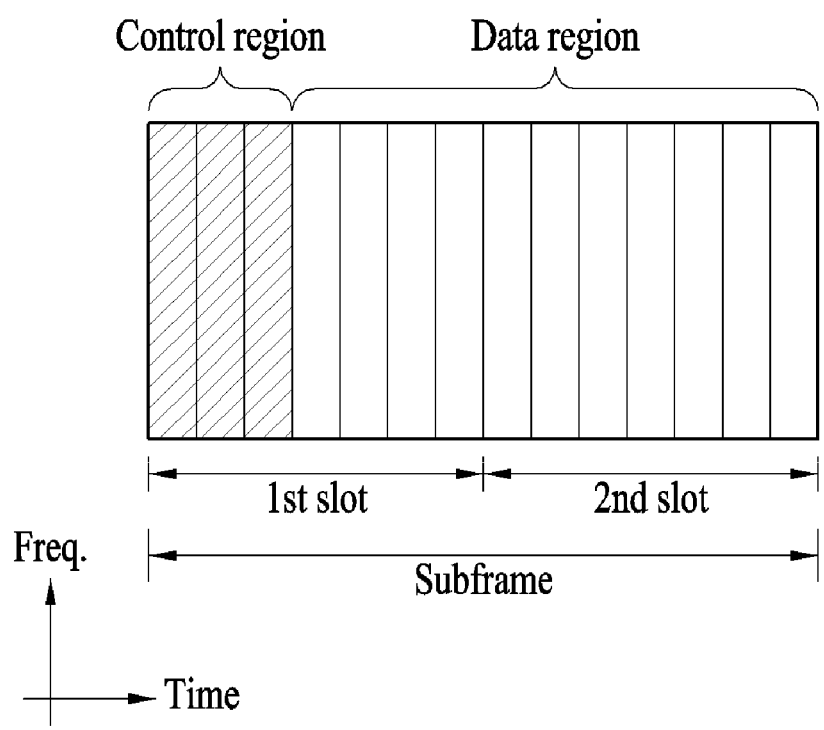
FIG. 4 is a diagram illustrating a structure of a downlink subframe of 3GPP LTE/LTE-A corresponding to one example of a wireless communication system.

FIG. 4 is a view illustrating an exemplary downlink subframe structure in the 3GPP LTE/LTE-A system as an exemplary wireless communication system.

Referring to FIG. 4, up to three (or four) OFDM symbols at the start of the first slot of a subframe corresponds to a control region to which a control channel is allocated. The other OFDM symbols of the subframe correspond to a data region to which a PDSCH is allocated. DL control channels used in 3GPP LTE include a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe, carrying information about the number of OFDM symbols used for transmission of control channels in the subframe. The PHICH carries a HARQ ACK/NACK signal in response to a UL transmission.

Control information carried on the PDCCH is called Downlink Control Information (DCI). DCI format 0 is defined for UL scheduling, and DCI formats 1, 1A, 1B, 1C, 1D, 2, 2A, 3, and 3A are defined for DL scheduling. Depending on its usage, a DCI format selectively includes information such as a hopping flag, an RB assignment, a Modulation Coding Scheme (MCS), a Redundancy Version (RV), a New Data Indicator (NDI), a Transmit Power Control (TPC), a cyclic shift, a DeModulation Reference Signal (DM RS), a Channel Quality Information (CQI) request, an HARQ process number, a Transmitted Precoding Matrix Indicator (TPMI), Precoding Matrix Indicator (PMI) confirmation, and so on.

The PDCCH delivers a transport format and resource allocation information for a Downlink Shared Channel (DL-SCH), a transport format and resource allocation information for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a TPC command, Voice Over Internet Protocol (VoIP) activation indication information, and so on. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of bits in the PDCCH are determined according to the number of CCEs. An eNB determines a PDCCH format according to control information to be transmitted to a UE and adds a Cyclic Redundancy Check (CRC) to the control information. The CRC is masked by an Identifier (ID) (e.g., a Radio Network Temporary Identifier (RNTI)) according to the owner or usage of a PDCCH. If the PDCCH is directed to a specific UE, its CRC may be masked with a Cell-RNTI (C-RNTI) of the UE. If the PDCCH is for a paging message, the CRC of the PDCCH may be masked with a Paging Radio Network Temporary Identifier (P-RNTI). If the PDCCH delivers system information (more specifically, a System Information Block (SIB)), the CRC may be masked with a System Information RNTI (SI-RNTI). If the PDCCH is for a random access response, the CRC may be masked with a Random Access-RNTI (RA-RNTI).

Figure 5:
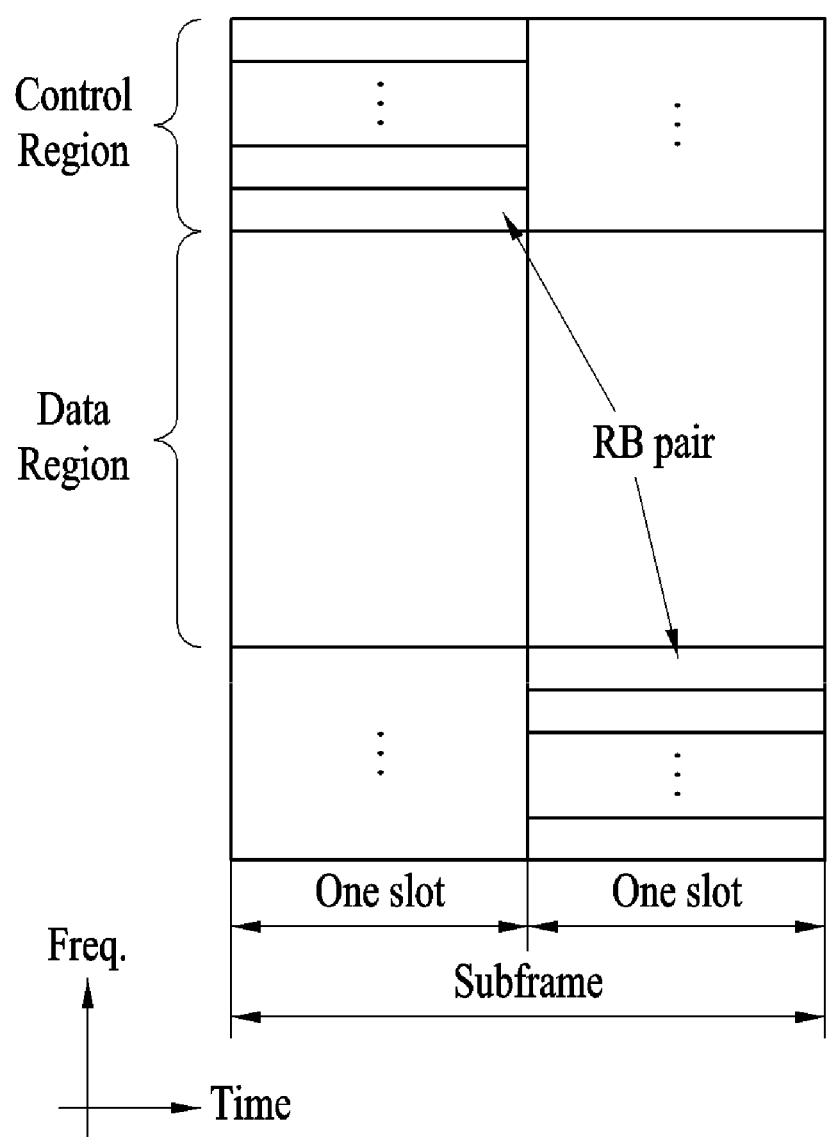
FIG. 5 is a diagram illustrating a structure of an uplink subframe of 3GPP LTE/LTE-A system corresponding to one example of a wireless communication system.

FIG. 5 is a view illustrating an exemplary uplink subframe structure in the 3GPP LTE/LTE-A system as an exemplary wireless communication system.

Figure 6:
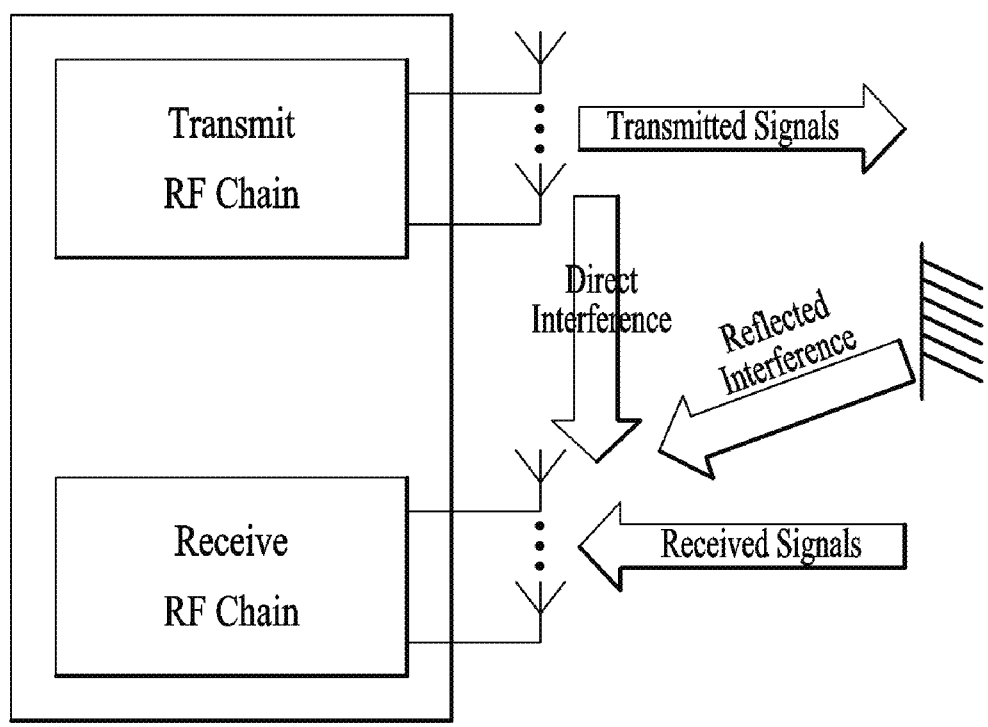
FIG. 6 is a conceptual diagram illustrating a transmission/reception link and self-interference (SI) in an FDR communication situation.

Referring to FIG. 6, a UL subframe includes a plurality of (two) slots. A slot may include a different number of SC-FDMA symbols according to a CP length. The UL subframe may be divided into a control region and a data region in the frequency domain. A Physical Uplink Shared Channel (PUSCH) carrying user data such as voice is allocated to the data region. A Physical Uplink Control Channel (PUCCH) carrying Uplink Control Information (UCI) is allocated to the control region. The PUCCH includes an RB pair located at both ends of the data region along the frequency axis and hops over a slot boundary.

The PUCCH may carry the following control information.
  Scheduling Request (SR): information used to request UL-SCH resources. The SR is transmitted in On-Off Keying (OOK).
  HARQ ACK/NACK: a response signal to a DL data packet on a PDSCH.

The HARQ ACK/NACK indicates whether the DL data packet has been received successfully. A 1-bit ACK/NACK is transmitted as a response to a single DL CodeWord (CW) and a 2-bit ACK/NACK is transmitted as a response to two DL CWs.
  Channel Quality Indicator (CQI): feedback information for a DL channel. MIMO-related feedback information includes an RI, a PMI, a PTI, and so on. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

An FDR Tx/Rx system is able to transmit and receive a UL signal and a DL signal at the same time on the same frequency band. Hence, the FDR Tx/Rx system is able to increase spectral efficiency as much as double compared to a legacy system that transmits and receives a UL signal and a DL signal by dividing a resource into a frequency resource and a time resource. Hence, the FDR Tx/Rx system is getting spotlight as one of core technologies of a next generation 5G mobile communication system.

In the aspect of a random wireless device, the FDR using a single frequency transmission band can be defined as a transmission resource configuration scheme that performs transmission and reception at the same time via the single frequency transmission band. As a specific example, when wireless communication is performed between a general BS (or a relay, a relay node, a remote radio head (RRH), etc.) and a wireless UE, the transmission resource configuration scheme can be comprehended as a transmission resource configuration scheme that simultaneously performs DL transmission and UL reception of the BS and DL reception and UL transmission of the wireless UE via a single frequency transmission band. As a different example, when device-to-device direct communication (D2D communication) is performed between wireless UEs, the transmission resource configuration scheme can be comprehended as a transmission resource configuration scheme that simultaneously performs transmission and reception on the same frequency transmission band between the wireless UEs. In the following, the present invention illustrates a case of performing wireless transmission and reception between a general BS and a wireless UE and describes FDR-related technologies. However, it is apparent that the present invention also includes a case of performing wireless transmission and reception between a UE and a network rather than the general BS. Moreover, it is apparent that the present invention includes a case of performing direct communication between UEs as well.

FIG. 6 is a conceptual view of Transmission (Tx) and Reception (Rx) links and Self-Interference (SI) in an FDM communication situation.

Referring to FIG. 6, there are two types of SI, direct interference caused by a signal transmitted through a Tx antenna of a BS or UE and then received at an Rx antenna of the BS or UE, and reflected interference caused by a signal reflected from adjacent topography. Due to a physical distance difference, the magnitude of SI is extremely large, compared to a desired signal. That's why it is necessary to effectively cancel SI, for implementation of an FDR system.

To effectively operate the FDR system, Self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{CBW}$=−147 dBm+10×$\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 7:
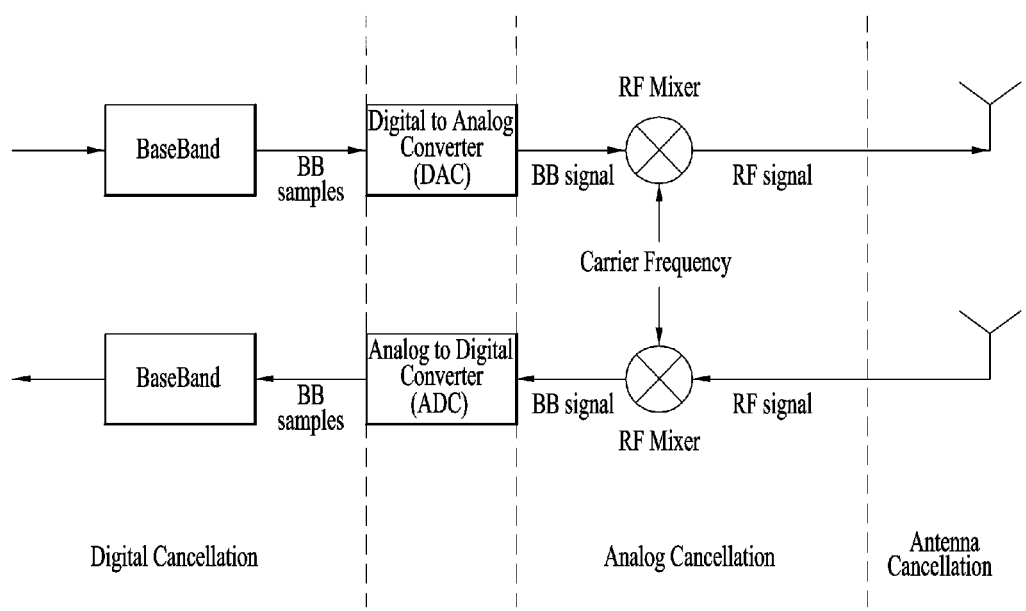
FIG. 7 is a diagram illustrating positions to which three interference schemes are applied at an RF transmission/reception end (or RF front end) of a device.

FIG. 7 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

The present invention proposes a method of transmitting a reference signal for estimating a self-interference channel in a full duplex MIMO system and a method of estimating an extended channel of a receiving end. According to the present invention, it is able to improve channel estimation performance by combining signals of a plurality of transmission units and enhance data rate performance of a full duplex system by reducing an amount of resources consumed for a reference signal necessary for estimating a self-interference channel.

To this end, the present invention considers MIMO (multiple inputs and multiple outputs) environment where transmission ends and reception ends of a base station and a user equipment support full duplex communication. In this case, every signal transmission unit is configured by a transmission section in which a DL reference signal for estimating a self-interference channel of the BS is transmitted, a transmission section in which a UL reference signal for estimating a self-interference channel of the UE is transmitted, and a data transmission/reception section in which DL data and UL data of the BS and the UE are transmitted and received at the same time.

The amount of resources of a self-interference channel of a device increases in proportion to the number of antennas of the device. In particular, in order to estimate a self-interference channel in every transmission unit, it is necessary to allocate the amount of resources equal to or greater than the number of antennas of the BS and the UE to transmission sections in which a downlink reference signal and an uplink reference signal are transmitted in every transmission unit. Hence, when resources less than the number of antennas of the device are allocated to a transmission section in which a reference signal is transmitted, if LS (Least-Square) or MMSE (Minimum Mean-Squared-Error) estimation is performed by combining reference signals included in a current transmission unit to estimate a self-interference channel matrix, an error may considerably occur in a noise-free system due to an underdetermined system of which the number of equations is less than a unknown value to be obtained.

When resources equal to or greater than the number of antennas of a device are used for a reference signal transmission section, the reference signal transmission section increases in accordance with the increase of the number of antennas, thereby reducing a data transmission/reception section. In particular, since DL transmission and UL transmission are simultaneously performed in a data transmission/reception section of a full duplex system, if the number of antennas of the BS or the UE increases, it may cause the decrease of data transfer rates of DL and UL at the same time.

In the following description, a reference signal corresponds to a signal for estimating a channel and the like. A resource element (RE) corresponds to a time unit or a frequency unit for transmitting a signal. In the following description, unless there is a special citation, a time resource is not distinguished from a frequency resource to apply a general signal transmission model. The time resource and the frequency resource are represented as the same resource using an RE. A transmission unit corresponds to an individual unit for transmitting a signal and the individual unit is configured by a plurality of REs predefined between a BS and a UE. A transmission unit may correspond to a slot, a resource block (RB), a subframe, a frame, or the like. A transmission unit or a transmission section includes a section in which a DL reference signal is transmitted, a section in which a UL reference signal is transmitted, and a section in which data is transmitted.

When a specific communication device has the N number of antennas, a self-interference channel is configured by N×N matrix. When a signal is transmitted from a specific antenna of the specific device, the signal can be received by all antennas of the specific device.

Figure 8:
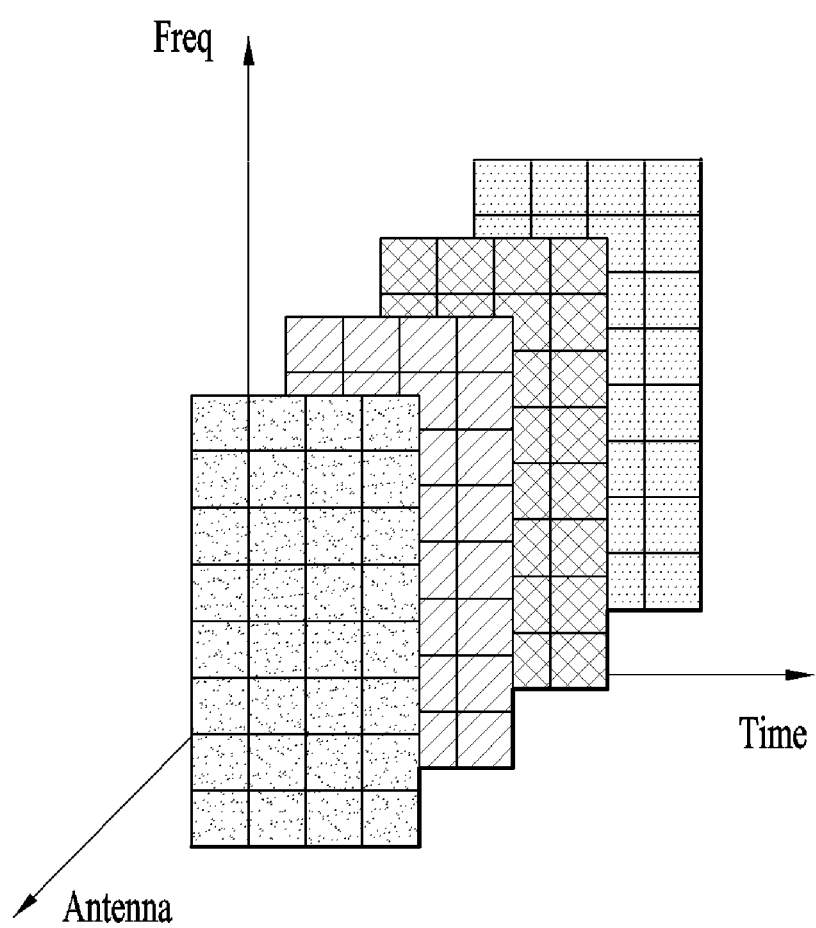
FIG. 8 is an exemplary diagram for explaining a method of transmitting a general reference signal.

FIG. 8 is an exemplary diagram for explaining a method of transmitting a general reference signal.

As shown in FIG. 8, a reference signal transmission scheme considered in the present invention corresponds to a general reference signal transmission scheme that reference signals are transmitted at the same time from antennas of each device using the same resource. The general reference signal transmission scheme can use both a sequence-based antenna such as Hadamard sequence, Walsh sequence, PN sequence, Chu sequence, and the like and a resource classification scheme. In this case, a BS and a UE can estimate the entire self-interference channels by utilizing reference signals transmitted and received by all antennas of the BS and the UE at the same time.

Figure 9:
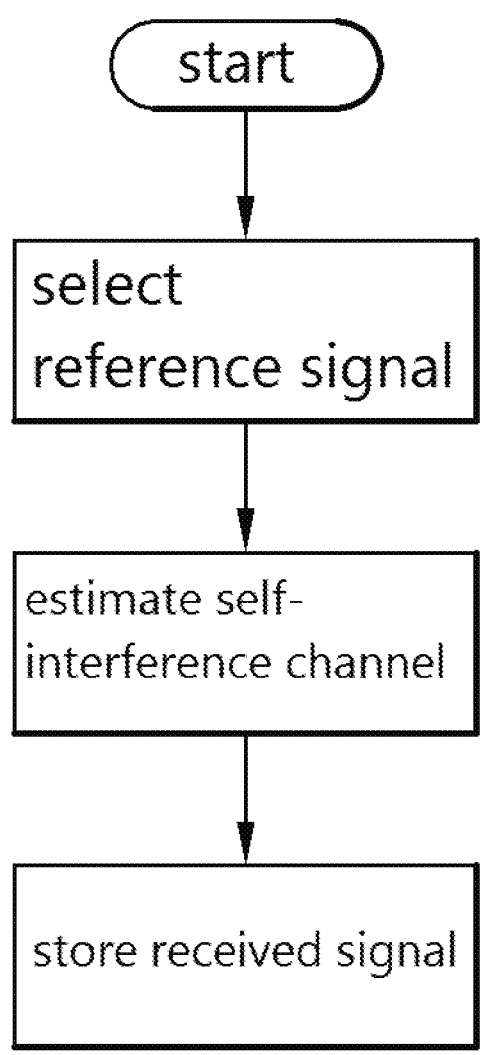
FIG. 9 is an exemplary flowchart for explaining a method of transmitting a reference signal for estimating a self-interference channel according to the present invention.

FIG. 9 is an exemplary flowchart for explaining a method of transmitting a reference signal for estimating a self-interference channel according to the present invention.

Referring to FIG. 9, a method of estimating a self-interference channel can include the steps of selecting a reference signal, estimating a self-interference channel, and storing a reception signal. A transmission unit can be configured in a manner of being divided into a DL reference signal transmission section, a UL reference signal transmission section, and a data transmission/reception section. The steps can be performed by each of configuration elements (e.g., a transmitter, a processor, a memory) of a device.

Figure 10:
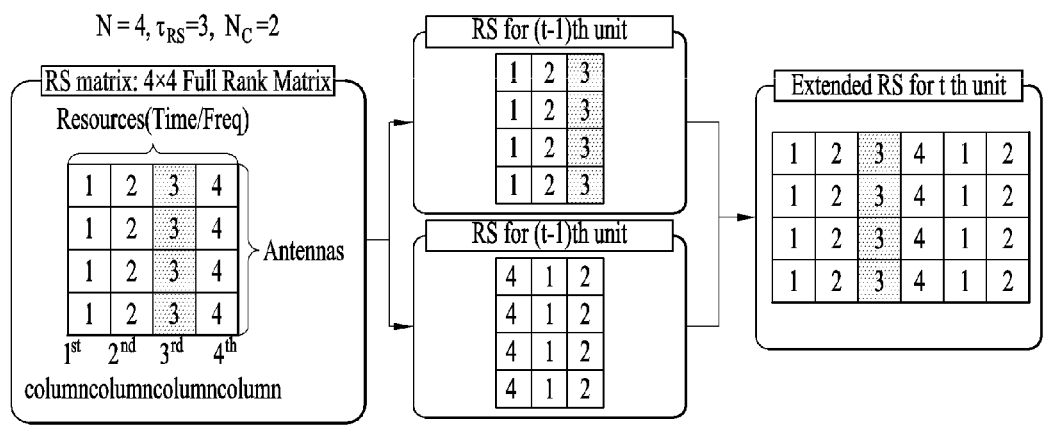
FIG. 10 is an exemplary diagram for explaining an operation scheme for a step of selecting a reference signal.

FIG. 10 is an exemplary diagram for explaining an operation scheme for a step of selecting a reference signal.

In each transmission unit included in the present invention, each device having the N number of antennas in a reference signal transmission section transmits a reference signal using the $\tau_{RS}$ number of resource elements (REs). In this case, $\tau_{RS}$ corresponds to the total number of REs usable for transmitting a reference signal in a corresponding device. In this case, a reference signal vector transmitted by a device in a single resource element via MIMO environment corresponds to a column selected from a basic reference signal sequence matrix $R_{basic}$. When a signal $y_{t,j}$ is received in response to a $j^{th}$ reference signal, which is fed back to each device via a self-interference channel in a $t^{th}$ transmission unit, the signal $y_{t,j}$ can be represented as equation 1 described in the following.

$$y_{t,j} = H_t^s r_{t,j} + n_{t,j} \qquad \text{[Equation 1]}$$

In equation 1, $r_{t,j}$ corresponds to a reference signal vector in a $j^{th}$ RE of a $t^{th}$ transmission unit, $H_t^s$ corresponds to a self-interference channel matrix in the $t^{th}$ transmission unit, and $n_{t,j}$ corresponds to an additive white Gaussian noise vector for the $r_{t,j}$.

A basic reference signal sequence matrix $R_{basic}$ corresponds to N×K matrix and has a rank equal to or greater than N. Columns of the $R_{basic}$ correspond to reference signals transmitted via the total N number of antennas in a specific RE resource. Rows of the $R_{basic}$ correspond to reference signals transmitted via the total N number of RE resources in a specific antenna.

After a reference signal is transmitted in the $t^{th}$ transmission unit of each device, the total reception signal matrix $Y_t$ fed back to each device via a self-interference channel in the $t^{th}$ transmission unit can be represented as equation 2 described in the following.

$$Y_t = H_t^s R_t + N_t \quad [\text{Equation 2}]$$

In equation 2, $R_t$ corresponds to $n \times \tau_{RS}$ reference signal matrix of the $t^{th}$ transmission unit having $r_{t,j}$ as a $j^{th}$ column. $N_t$ corresponds to $N \times \tau_{RS}$ additive white Gaussian noise matrix of the $t^{th}$ transmission unit having $n_{t,j}$ as the $j^{th}$ column.

In the following, a method of selecting a reference signal in a reference signal selection step is explained.

In the reference signal selection step, a BS and a UE can configure $R_t$ by selecting the $\tau_{RS}$ number of columns from a basic reference signal matrix $R_{basic}$ as a reference signal vector. In this case, the $R_{basic}$ matrix distinguishes reference signals from each other according to an antenna and an RE resource position and selects reference signals usable for the $\tau_{RS}$ number of RE resources by sequentially selecting the $\tau_{RS}$ number of consecutive columns. In this case, if the last column is selected before the $\tau_{RS}$ number of columns are all selected, the remaining columns are sequentially selected from the first column by applying a cyclic permutation scheme. In particular, when an index of a column lastly selected from the $R_{basic}$ in a $(t-1)^{th}$ transmission unit corresponds to k, a reference signal matrix $R_t$ of a $t^{th}$ transmission unit can be represented as equation 3 described in the following.

$$R_t = \begin{cases} [R_{basic}]_{k+1:k+\tau_{RS}} & k+\tau_{RS} \leq K \\ [[R_{basic}]_{k+1:K} \; [R_{basic}]_{1:k+\tau_{RS}-K}] & k+\tau_{RS} > K \end{cases} \quad [\text{Equation 3}]$$

In the equation 3, $[R_{basic}]_{a:b}$ corresponds to a submatrix including columns a to b of the $R_{basic}$.

In a self-interference channel estimation step after the reference signal selection step, a BS and a UE combine reference signals received in the number of transmission units with reference signals received in a current transmission unit and perform channel estimation such as LS, MMSE, or the like using the combined signals. In this case, a relationship between a self-interference channel ($H_t^s$) in the current transmission unit (t) and a self-interference channel ($H_{t-n}^s$) in a previous transmission unit can be represented as equation 4 described in the following.

$$H_{t-n}^s = H_t^s + D_n \quad [\text{Equation 4}]$$

In the equation 4, $D_n$ corresponds to a channel change component between the $H_t^s$ and the $H_{t-n}^s$.

In the self-interference channel estimation step, it is able to configure an extended model for reference signals received in the total ($N_c$+1) number of transmission units by handling the channel change component $D_n$ as a noise component using the relationship of the equation 4. In order to estimate a self-interference channel, a device (a UE or a BS) uses the relationship of the equation 4. In the equation 4, if it is able to utilize additive white Gaussian noise or statistical channel information, the $D_n$ can be modeled in a form of a colored noise model or an inter-channel correlation model. In consideration of the combination of received reference signals and the change of a self-interference channel, a combined extended reception signal matrix $\tilde{Y}_t$ can be represented as equation 5 described in the following using $N \times (N_c+1)\tau^{RS}$ matrix.

$$\tilde{Y}_t = [Y_{t-N_c}, \ldots, Y_T] = H_t^s \tilde{R}_t + [D_{N_c} R_{t-N_c} \ldots D_0 R_t] + \tilde{N}_t \quad [\text{Equation 5}]$$

In the equation 5, $\tilde{R}_t = [R_{t-N_c} \ldots R_t]$ corresponds to an extended reference signal matrix in a $t^{th}$ transmission unit and $\tilde{N}_t$ corresponds to $N \times (N_c+1)\tau_{RS}$ additive white Gaussian noise matrix of the total ($N_c$+1) number of transmission units.

A corresponding device (UE or BS) performs channel estimation such as LS or MMSE using the extended signal model illustrated in the equation 5 and can obtain information on a self-interference channel. In a reception signal storing step after the reference signal selection step, information on $Y_t$ received in a current transmission unit is stored in a memory 160/185 and the information can be reused in the future from a $(t+1)^{th}$ transmission unit.

Figure 11:
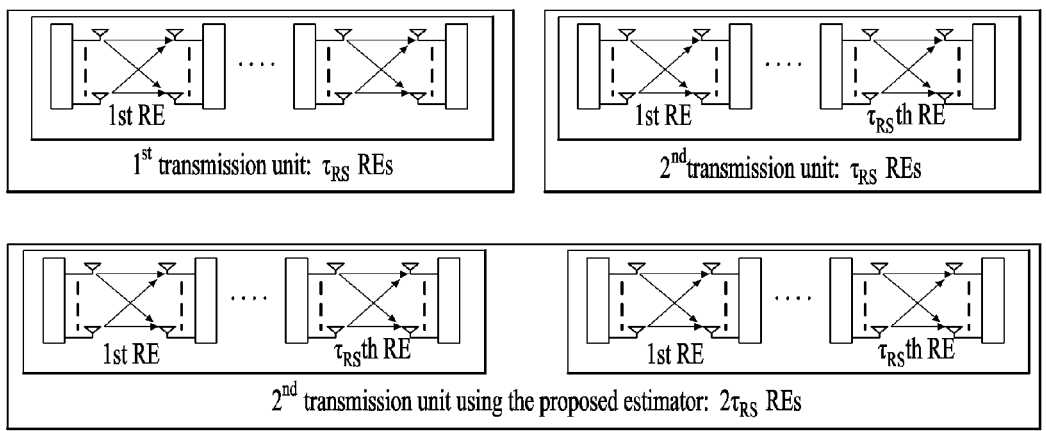
FIG. 11 is a diagram for explaining an example for a method of estimating an extended channel when a self-interference channel is estimated according to the present invention.

FIG. 11 is a diagram for explaining an example for a method of estimating an extended channel when a self-interference channel is estimated according to the present invention.

Figure 12:
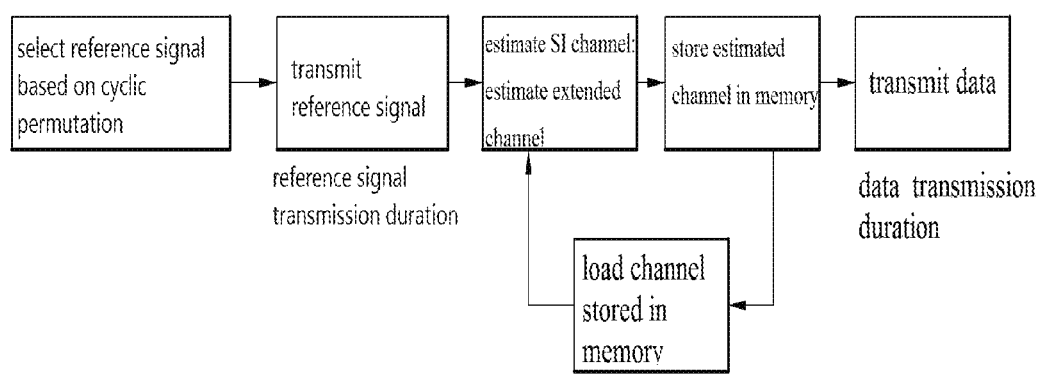
FIG. 12 is an exemplary diagram briefly illustrating a flow of a transmission unit operation in a device (UE or BS).

In the present invention, the practical number of REs corresponds to the number of REs of reference signals for performing LS and MMSE channel estimation procedure. When the number of REs usable for transmitting a reference signal according to a transmission unit is restricted to $\tau_{RS}$, as shown in FIG. 12, if reference signals of two transmission units are used by combining the reference signals using a method of estimating an extended channel according to the present embodiment, the practical number of REs of reference signals in use becomes $2\tau_{RS}$. Similarly, if reference signals of three transmission units are used by combining the reference signals using a method of estimating an extended channel according to the present embodiment, the practical number of REs of reference signals in use becomes $3\tau_{RS}$.

FIG. 12 is an exemplary diagram briefly illustrating a flow of a transmission unit operation in a device (UE or BS).

A corresponding device selects reference signals to be transmitted in a current transmission unit by applying a cyclic permutation-based scheme based on the equation 3 in the reference signal selection step. Subsequently, the device transmits the selected reference signals in a reference signal transmission section of each device. The device estimates a self-interference channel (or calculates an estimation value for the self-interference channel) by applying an extended channel estimation scheme with a method such as LS or MMSE to reference signals, which are fed back via the self-interference channel in the current transmission unit (e.g., $t^{th}$ transmission unit) and previous transmission units (e.g., the $N_c$ number of transmission units appearing after the $t^{th}$ transmission unit), using a predetermined scheme (e.g., the extended signal model described in the equation 5). Subsequently, the device can store information obtained from the current transmission unit in a memory to utilize the information in a different transmission unit. A UE can transmit uplink data.

According to the related art, in order for a device to estimate a self-interference channel, REs equal to greater than the number of antennas of the device were used to transmit a reference signal in every transmission unit. However, according to the present invention, it is able to estimate a self-interference channel by using REs less than the number of antennas in transmitting a reference signal. And, when reference signals are selected and transmitted, although the number of REs for transmitting the reference signals is less than the number of antennas of each device, since a rank of an extended reference signal matrix of a combined signal model is secured as much as a basic reference signal sequence matrix, it is able to estimate the entire elements of a self-interference channel matrix.

The present invention has a merit in that the present invention is applicable irrespective of a sequence type used in a system and a device.

When the number of REs for transmitting a reference signal is reduced, it is able to increase the number of REs to be used for a data transmission/reception section. In particular, since DL transmission and UL transmission are simultaneously performed in a data transmission/reception section of a full duplex system, when either a BS or a UE uses REs less than the number of antennas to transmit a reference signal, it is able to obtain an effect of increasing a data transfer rate in DL and UL at the same time. The reference signal transmission scheme and the extended channel estimation scheme proposed in the present invention can be applied not only to a self-interference channel of a full-duplex communication but also to a case of estimating a data channel in a general MIMO system. The extended channel estimation scheme proposed in the present invention can also be used for a case of using REs equal to or greater than the number of antennas in transmitting a reference signal to improve channel estimation performance.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of estimating a self-interference channel and an apparatus therefor can be applied to various wireless communication systems including 3GPP LTE/LTE-A, 5G communication system, and the like.

What is claimed is:

1. A method for estimating a self-interference channel by a communication device operating in a full duplex mode, the method comprising:
   transmitting a reference signal in a first transmission unit through resource elements (REs) less than a number of antenna of the communication device;
   estimating a self-interference channel using a first reception signal matrix fed back via the self-interference channel in the first transmission unit and reception signal matrixes fed back via the self-interference channel in a predetermined number of transmission units prior to the first transmission unit; and
   storing information on the estimated self-interference channel.

2. The method of claim 1, wherein a reference signal of the first transmission unit is transmitted by applying a partial reference signal sequence matrix corresponding to columns, which are less than the number of antenna of the communication device and selected from a predefined N×K reference sequence matrix, to the reference signal of the first transmission unit.

3. The method of claim 2, further comprising:
   transmitting a reference signal in a second transmission unit via REs less than the number of antennas of the communication device,
   wherein the reference signal of the second transmission unit is transmitted by applying a partial reference signal sequence matrix corresponding to columns, which are selected as many as the number from a next column of the selected columns from the predefined N×K reference sequence matrix, to the reference signal of the second transmission unit.

4. The method of claim 2, further comprising:
   transmitting a reference signal in a second transmission unit via REs less than the number of antennas of the communication device,
   wherein when the last column applied to the reference signal of the first transmission unit corresponds to the last column in the predefined N×K reference signal sequence matrix, the reference signal of the second transmission unit is transmitted by applying a partial reference signal sequence matrix corresponding to columns, which are selected as many as the number from the first column of the predefined N×K reference signal sequence matrix based on a cyclic permutation scheme, to the reference signal of the second transmission unit.

5. The method of claim 2, wherein a specific column of the predefined N×K reference signal sequence matrix corresponds to a reference signal transmitted via the total K number of antennas in a specific RE.

6. The method of claim 5, wherein a specific row of the predefined N×K reference signal sequence matrix corresponds to a reference signal transmitted via the N number of REs through a specific antenna port.

7. The method of claim 1, wherein the communication device contains a user equipment or a base station.

8. A communication device in a full duplex mode for estimating a self-interference channel, the communication device comprising:
   a transmitter configured to transmit a reference signal in a first transmission unit through resource elements (REs) less than a number of antenna of the communication device;

a processor configured to estimate a self-interference channel using a first reception signal matrix fed back via the self-interference channel in the first transmission unit and reception signal matrixes fed back via the self-interference channel in a predetermined number of transmission units prior to the first transmission unit; and a memory configured to store information on the estimated self-interference channel.

9. The communication device of claim 8, wherein the processor is configured to apply a partial reference signal sequence matrix corresponding to columns, which are less than the number of antennas of the communication device and selected from a predefined N×K reference sequence matrix, to the reference signal, to the reference signal of the first transmission unit.

10. The communication device of claim 9, wherein the transmitter is configured to transmit a reference signal in a second transmission unit via REs less than the number of antennas of the communication device and wherein the processor is configured to apply a partial reference signal sequence matrix corresponding to columns, which are selected as many as the number from a next column of the selected columns from the predefined N×K reference sequence matrix, to the reference signal of the second transmission unit.

11. The communication device of claim 9, wherein the transmitter is configured to transmit a reference signal in a second transmission unit via REs less than the number of antennas of the communication device and wherein when the last column applied to the reference signal of the first transmission unit corresponds to the last column in the predefined N×K reference signal sequence matrix, the processor is configured to apply a partial reference signal sequence matrix corresponding to columns, which are selected as many as the number from the first column of the predefined N×K reference signal sequence matrix based on a cyclic permutation scheme, to the reference signal of the second transmission unit.

12. The communication device of claim 9, wherein a specific column of the predefined N×K reference signal sequence matrix corresponds to a reference signal transmitted via the total K number of antennas in a specific RE.

13. The communication device of claim 12, wherein a specific row of the predefined N×K reference signal sequence matrix corresponds to a reference signal transmitted via the N number of REs through a specific antenna port.

14. The communication device of claim 8, wherein the communication device contains a user equipment or a base station.

* * * * *